US006322064B1

(12) United States Patent
Tallving

(10) Patent No.: US 6,322,064 B1
(45) Date of Patent: Nov. 27, 2001

(54) DEVICE FOR HOLDING PIECES OF WOOD

(76) Inventor: Nils Tallving, FinspÅngsvägen 497, Norrköping, SE 605 98 (SE)

(*) Notice: Subject to any disclaimer, the term of this patent is extended or adjusted under 35 U.S.C. 154(b) by 0 days.

(21) Appl. No.: 09/673,219

(22) PCT Filed: Apr. 15, 1999

(86) PCT No.: PCT/SE99/00601

§ 371 Date: Oct. 13, 2000

§ 102(e) Date: Oct. 13, 2000

(87) PCT Pub. No.: WO99/55504

PCT Pub. Date: Nov. 4, 1999

(30) Foreign Application Priority Data

Apr. 15, 1998 (SE) .................................................. 9801297

(51) Int. Cl.[7] ...................................................... B23Q 3/00

(52) U.S. Cl. ............................ 269/296; 269/287; 269/98; 269/95

(58) Field of Search .................................... 269/296, 287, 269/289 R, 98, 95, 902; 182/151, 224–227; 144/4

(56) References Cited

U.S. PATENT DOCUMENTS 654,134 * 7/1900 Clark .................................... 269/296
4,121,814 * 10/1978 Prior .................................... 269/296
4,641,822 2/1987 Fenerty .
4,718,652 * 1/1988 Liebenstein .......................... 269/269
4,993,686 * 2/1991 Diaz .................................... 269/296
5,072,918 * 12/1991 Campbell ............................ 269/296
5,632,475 * 5/1997 McCanse ............................ 269/296

FOREIGN PATENT DOCUMENTS 157968 8/1987 (NO) .

* cited by examiner

*Primary Examiner*—Joseph J. Hail, III
*Assistant Examiner*—Lee Wilson

(57) ABSTRACT

A device for holding varying pieces of wood when cutting, for instance with a chain saw, comprising a frame (9), a pendulum (2) having spikes (4) and being pivotally mounted at an upper part (8) of the frame and a lower frame part having upwardly directed spikes (3). The pendulum (2) with its spikes (4) is arranged to assume steplessly varying positions in relation to the upwardly directed spikes (3) of the lower frame part. The freely pivoting pendulum (2) with its spikes (4) is arranged, by its own weight, to engage into and hold an inserted piece of wood within the range of pivotation of the pendulum.

19 Claims, 5 Drawing Sheets

DEVICE FOR HOLDING PIECES OF WOOD

FIELD OF THE INVENTION AND PRIOR ART

The present invention relates to a device for holding wood when cutting with suitable cutting equipment. This cutting equipment normally consists of a saw, for instance a chain saw.

It is desirable to be able to hold wood of various types, such as logs, crooked branches, non-return pallets and the like for cutting with a chain saw in a suitable working height, with as little risk for injuries as possible. Generally the cutting is carried out with the timber lying on the ground or in other devices which are not suitable for the purpose, which involves a great risk for personal injuries and damaged tools. Consequently, there is a great need for a device for holding wood of varying length, thickness and shape in a simple and secure way.

From U.S. Pat. No. 4,718,652 a device according to the preamble of the subsequent claim 1 is already known. With this known device, the pendulum, despite its pivotability, will in practice assume one out of several predetermined pivotal positions determined by the construction of the pendulum, and then primarily by the disposition of the spikes oil the pendulum. This implies that the orientation of a piece of wood which is held by the known device, will vary considerably. Expressed in other words in practice the inclination of the piece of wood will depend on the diameter of the piece of wood and on which of the spikes of the pendulum at present being in engagement with the piece of wood. According to the U.S. patent, the spikes are namely arranged in a row, extending essentially transversely to the pivot axis of the pendulum.

OBJECT OF THE INVENTION

The object of the invention is to develop further, the shaping referred to in the preamble of claim 1 so that the ability of the device to receive and hold a piece of wood will be improved in the sense that a user of the device conveniently can insert pieces of wood into it and get these pieces of wood to assume desired positions or orientations.

SUMMARY OF THE INVENTION

The object presented is, according to the invention, achieved in that the device is designed in accordance with the characteristic of the subsequent claim 1. As a consequence of the pendulum with its spikes being arranged to assume steplessly varying positions in relation to the upwardly directed spikes of the lower part of the frame, a user of the device will always be able to obtain the desired position and orientation of a piece of wood in the device, for instance a horizontal position of the piece of wood. independent of the diameter or the shape of the piece of wood.

According to a preferred embodiment of the invention, the freely pivoting pendulum is adjustable as to its length between the pivot axis of the pendulum and its spikes. In case of for instance an assortment of particularly thick pieces of wood this length can be reduced.

According to another preferred embodiment, the pendulum is movable upwards, for thicker pieces of wood, by being lifted above a horizontal plane, whereby it is disengaged from a locking shoulder and can be moved sideways in order thereafter to be re-mounted in a lower hole of the pendulum.

For maximum simplicity concerning the handling of pieces of wood, it its preferred that the frame is openly shaped towards one side for allowing insertion of pieces of wood sideways from the open side. During such insertion sideways, the pendulum can be moved away manually or through the effect from the piece of wood or the pendulum can then as well be in a raised position, e.g. by the pendulum resting on the locking shoulder mentioned above.

Furthermore, it is preferred that the pendulum is essentially U-shaped with a base part provided with the spikes and shanks each provided with holes for receiving dowels or pins constituting the pivotal mounting of the pendulum.

According to a further embodiment of the invention, the spikes of both the pendulum and the upper frame part are arranged in rows orientated essentially along the pivotal axis of the pendulum.

Further characteristics of the device according to the invention and advantages in connection thereto will appear from the independent claims and the subsequent description.

BRIEF DESCRIPTION OF THE DRAWINGS

With reference to the accompanying drawings a closer description of embodiments of the invention, given as examples, will follow below.

In the drawings.

DETAILED DESCRIPTION OF PREFERRED EMBODIMENTS

Figure 1:
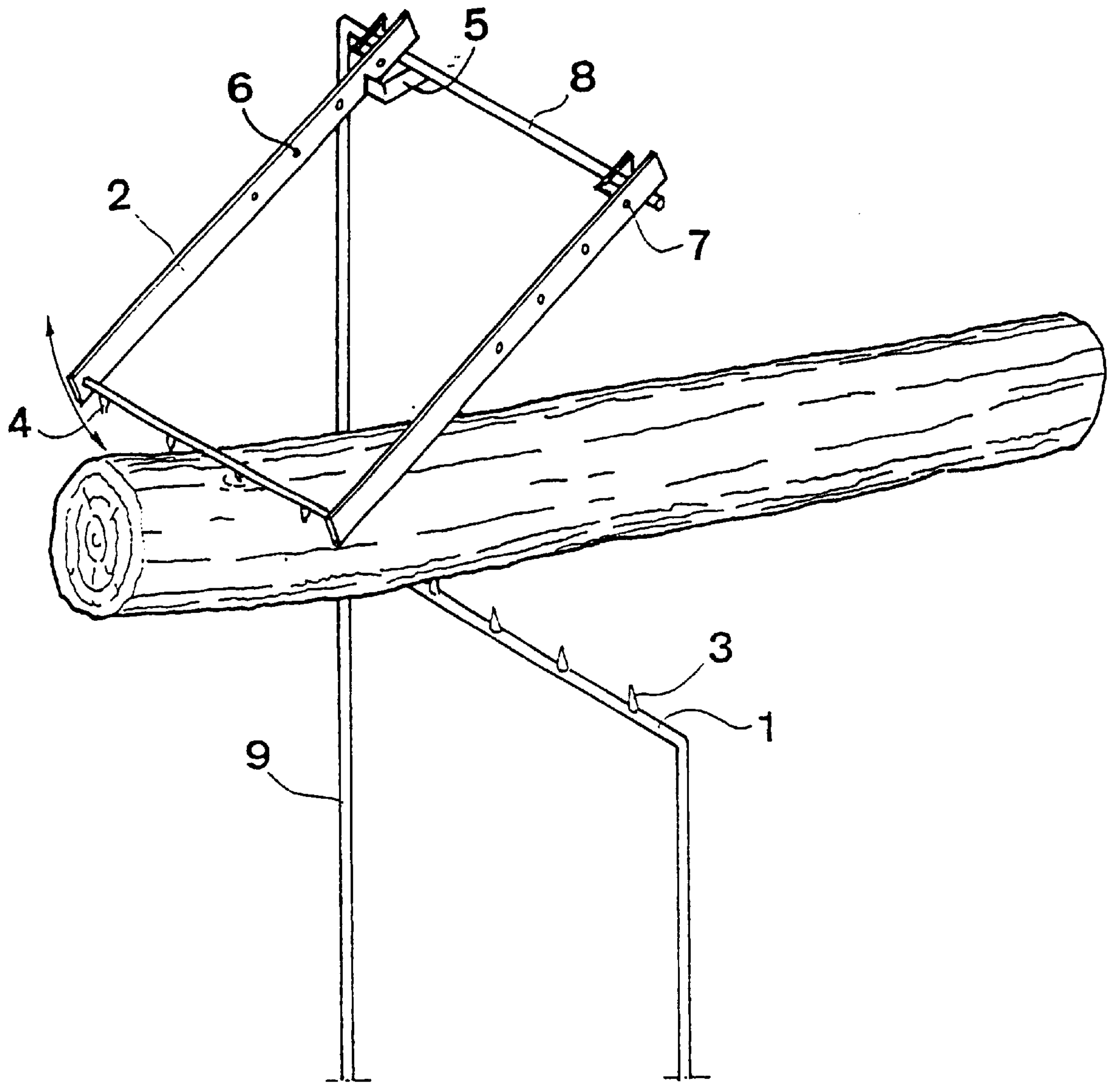
FIG. 1 is a view illustrating purely in principle an embodiment of the device according to the invention seen obliquely from behind a piece of wood being illustrated as being held in the device.

In the diagrammatical view in FIG. 1, 1 represents the lower part of a frame generally represented by 9. 2 represents the pendulum itself 3 represents spikes arranged on the lower part 1 of the frame. Spikes arranged on the pendulum 2 are represented by 4. 5 represents a locking shoulder. Holes in the pendulum are represented by 6. 7 represents dowels or pins. These are arranged to be received in the holes 6 of the pendulum. 8 represents an upper part of the frame 9.

The pendulum 2 with its spikes 4 is arranged to assume steplessly varying positions in relation to the spikes 3 of thin lower part of the frame. The pendulum 2 is freely pivoting so that it by its own weight can engage into and hold a piece of wood with its spikes 4 within the range of rotation of the pendulum.

The pendulum 2 is movable upwards, for thicker pieces of wood, by being lifted above the horizontal plane, whereby the pendulum is disengaged from the locking shoulder 5 and can be moved sideways in order thereafter to be re-mounted in a lower hole 6 in the pendulum. Consequently, the pendulum is movable sideways along the dowels or pins 7 to and out of, respectively, engagement with these. The locking shoulder 5 is arranged to keep the pendulum on the dowels or pins 7 but, as already said above, the pendulum can be brought out of engagement with the dowels or pins 7 when the pendulum has been lifted up so that it can be moved past the locking shoulder 5.

The conjoint action of the spikes 4 on the pendulum and the spikes 3 on the lower frame part 1 results in that varying pieces of wood can be held by the weight of the piece of wood itself in its overhang.

One end of the piece of wood can be inserted into the frame from the front, whereby the pendulum is pushed backwards in order to freely adapt itself to the thickness of the wood. When the piece of wood has assumed a desired level and is released. the overhanging weight will cause that the spikes 3 on the lower part 1 of the frame prevent the piece of wood from sliding away when the spikes 4 on the underside of the pendulum penetrates into the upper side of the piece of wood. As already pointed out above, the height of the pendulum can be varied in its fixing point on the upper part 8 of the frame to allow the pendulum to work in different intervals.

A piece of wood that is held in the device can freely be cut until the last cutting blade.

The frame 9 is openly shaped towards one side for allowing insertion of pieces of wood sideways from the open side. A user thereby obtains maximum freedom to place a piece of wood in the device in the most convenient way.

FIGS. 2–5 illustrate an example of how the principle of the device, described with the aid of FIG. 1, can be realized. In FIGS. 2–5, as far as possible, the same references as in FIG. 1 are used for corresponding components, while further references have been added for certain details. When comparing FIGS. 2 and 3, it is evident how the pendulum 2 with different holes engages with the dowels or pins 7 provided on the upper part 8 of the frame. Within the scope of the expression upper frame part 8, is here not only included an essentially horizontal beam 10 attached to an essentially vertical side beam 11 of the frame 9, but also the uppermost part of the beam 11. More closely, one of the pins 7 is attached to the upper part of the beam 11, while the other of the pins 7 is attached to a beam part 12 which in its turn is attached to the horizontal beam 11. Consequently, the pins 7 in conjoint action with the holes 6 of the pendulum, with which the pins engage at the moment, constitute the pivotal mounting of the pendulum. The pendulum is movable along the pins into and out of, respectively, engagement between the pins and the holes of the pendulum. The previously mentioned locking shoulder 5, in certain positions of the pendulum serves as a delimiter for such a movement. More closely, when the pendulum is in its normal freely pivoting functional mode, the locking shoulder 5 prevents the pendulum from being pushed out from the pins 7. However the pendulum 2 can be raised to the position illustrated in FIG. 4, in which the pendulum can either be brought to rest in a raised position on the locking shoulder 5 or can be moved further sideways so that the pendulum will get out of engagement with the pins 7 and the pendulum will be released from these pins.

The pendulum is essentially U-shaped with a base part 13 provided with the spikes 4 and shanks 14 each provided with a set of holes 6 for receiving the pins 7.

Figure 4:
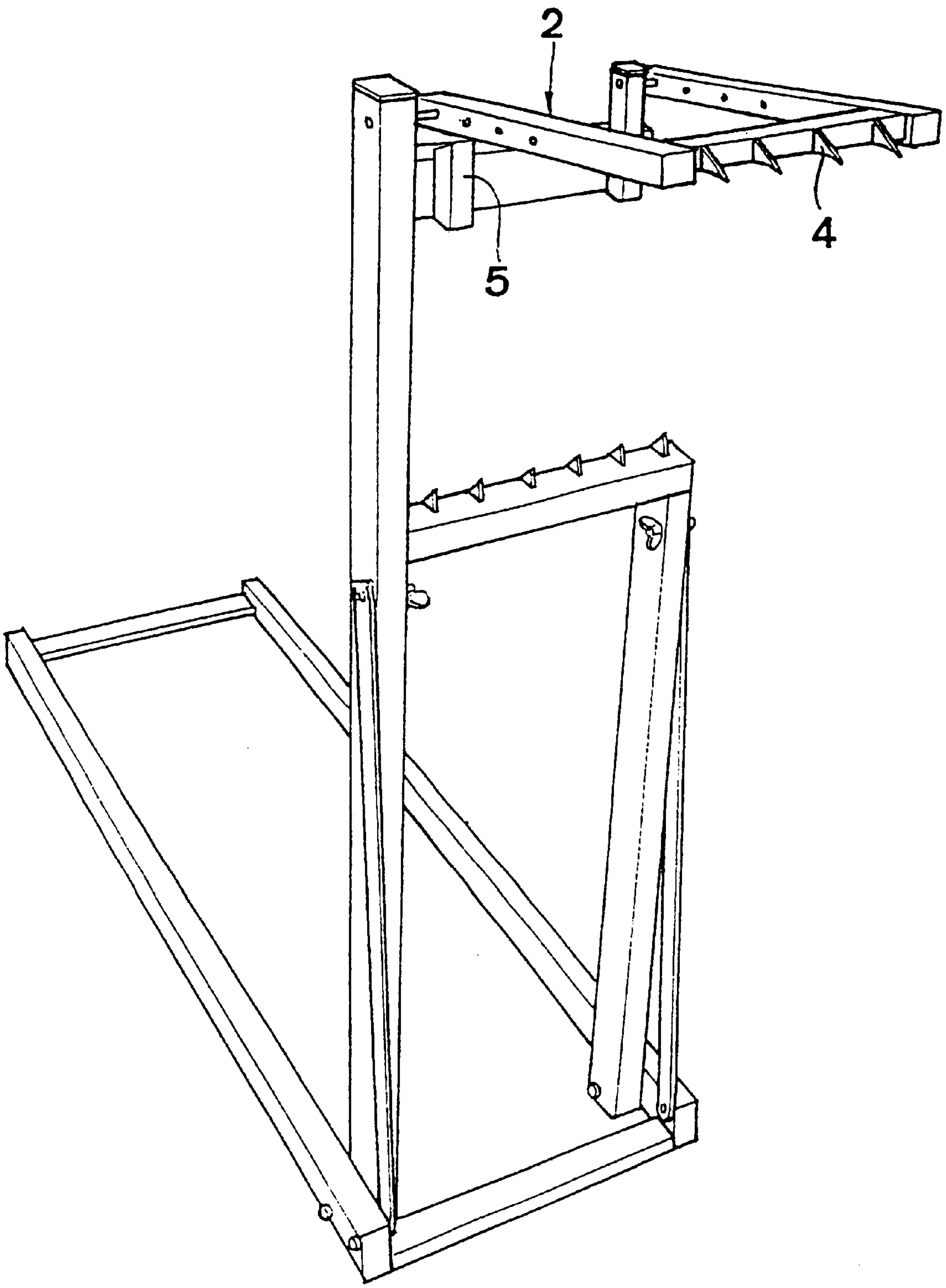
FIG. 4 is a perspective view illustrating the device according to FIG. 2 from another angle and with the pendulum pivoted upwards and displaced so that it rests on a locking shoulder.

The beam 11 which is provided at one side of the frame, extends past the lower frame part 1, which is provided with the spikes 3, at one side of it, but this extending part has no counterpart at the other end of the lower frame part 1, so an opening particularly clearly illustrated in FIG. 4, is there let free. This side opening allows a piece of wood to be inserted into the device from one side of the device to a position between the pendulum and the spikes 3 of the lower frame part 1. Consequently, there is no limitation in the sense that pieces of wood can only be inserted into the device in a lengthwise movement.

Figure 2:
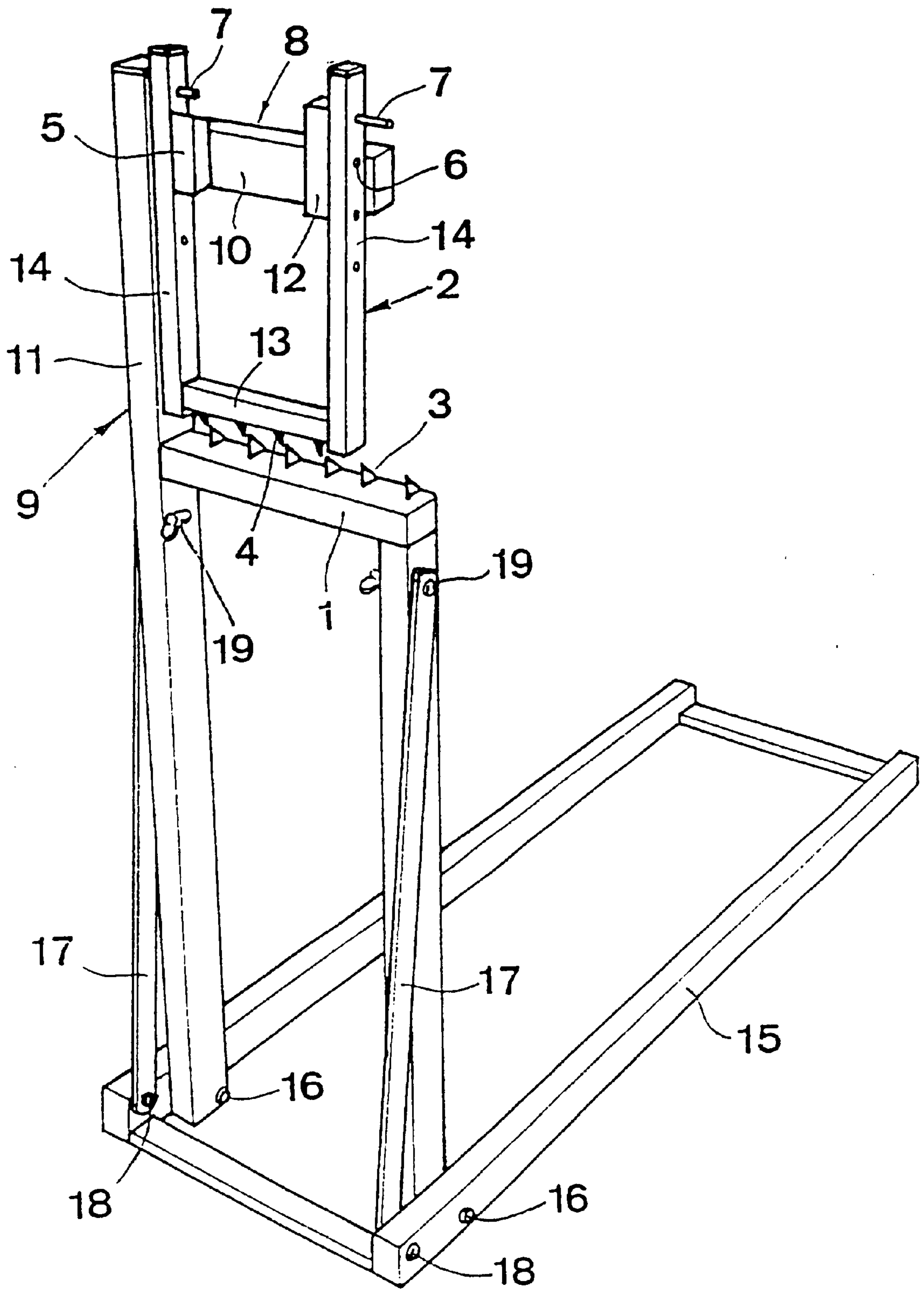
FIG. 2 is a perspective view from principally the same direction as in FIG. 1 of a more detailed embodiment of the invention, however without a piece of wood.
Figure 3:
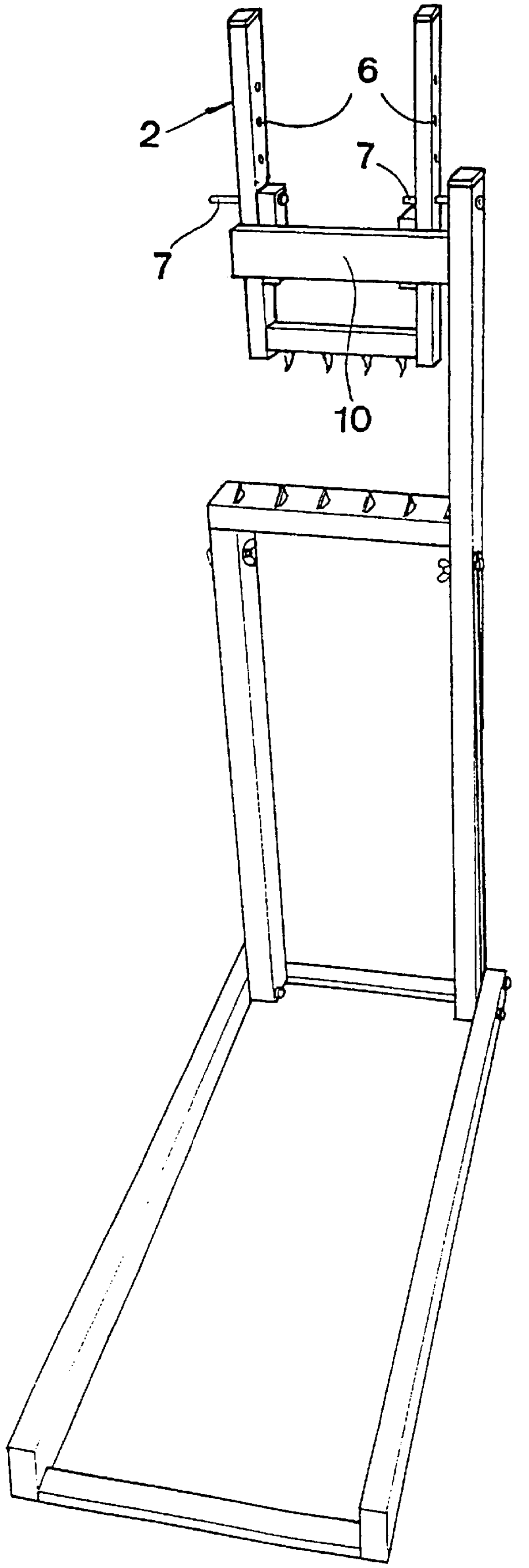
FIG. 3 is a perspective view of the device according to FIG. 2 seen from another direction and with its pendulum in a raised position.

The frame 9 is pivotally connected to a base frame, generally represented by 15, which is intended to support against an underlayer. The connections, which allow such pivotability, are represented by 16. The frame 9 is pivotable in relation to the base frame 15 between a position in which it is raised from it, illustrated in FIGS. 2–4, and a position in which it is folded towards the base frame 15, illustrated in FIG. 5. Releasable means 17 are provided for locking the frame 9 in its raised position. These means have, as illustrated in FIGS. 2–4, the character of bars operating between points 18 relative to the base frame 15 and points 19 relative to the frame 9.

Figure 5:
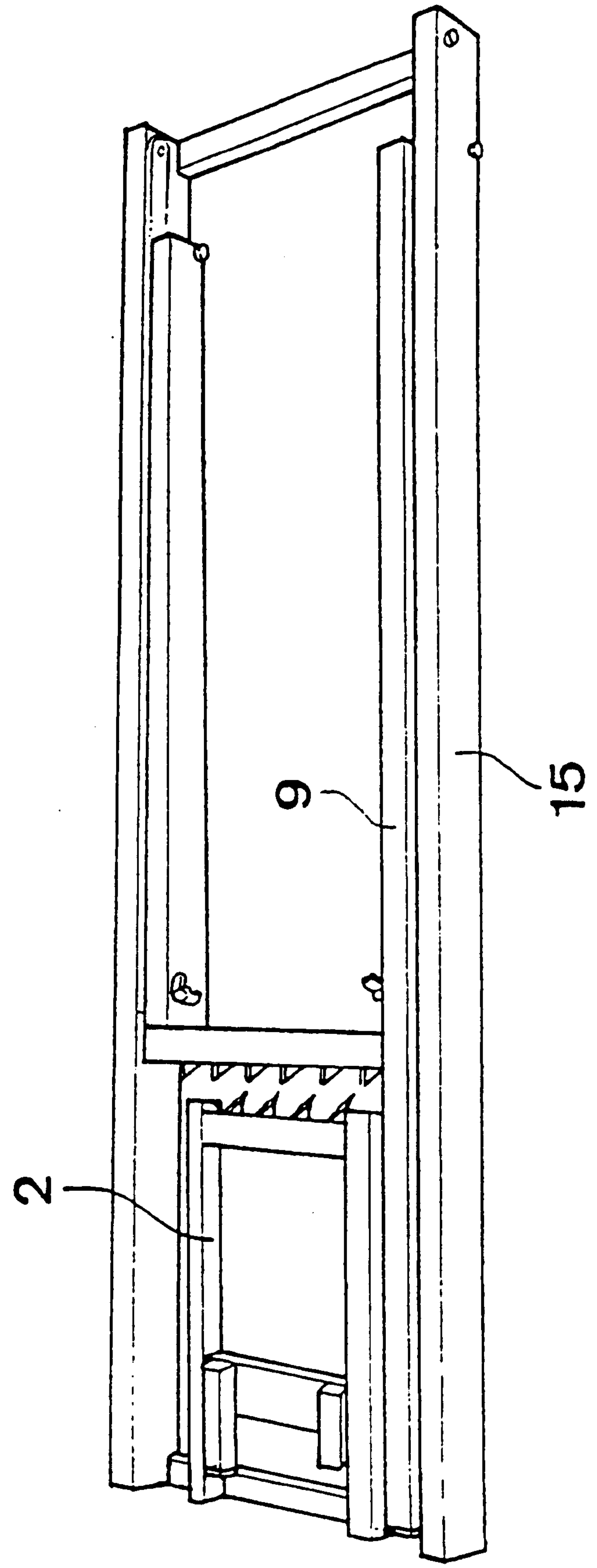
FIG. 5 is a perspective view of the device according to FIG. 2 in a folded position.

The frame 9 together with its pendulum 2 is foldable to a position essentially inside the base frame as can be seen from FIG. 5, which results in that the device can easily be transported and stored with a minimum of required space.

It is preferred that the bars 17 are pivotally connected to the base frame 15 and are releasable at their fixing points 19 in relation to the frame 9, for instance with the aid of winged nuts as indicated in the figures, so that both the frame 9 and the bars 17 can be folded down into the base frame 15.

As in FIG. 1, the spikes 3 and 4. respectively, on the lower frame part 1 and the pendulum 2 are placed in rows which are essentially parallel with each other, which furthermore extend essentially along the pivotal axis of the pendulum 2. This implies that the rows of spikes 3, 4 will extend essentially crosswise to the longitudinal direction of the pieces of wood which are placed in the device. With such a disposition of the spikes it will always be possible to effectively hold the piece of wood in the device in an essentially horizontal position.

The embodiments presented above only serve to exemplify the inventional idea. Once this has been presented, men skilled in the art are of course capable of performing detailed adjustments and propose equivalent solutions without departing from the scope of protection which is intended with the subsequent claims.

What is claimed is:

1. A device for holding varying pieces of wood when cutting, the device comprising:

a frame (9), a pendulum (2) having spikes (4) and being pivotally mounted at an upper part (8) of the frame (9), and a lower frame part (1) having upwardly directed spikes (3), characterized in that the pendulum (2) with the spikes (4) thereof is arranged to assume steplessly varying positions in relation to the upwardly directed spikes (3) of the lower frame part (1), the freely pivoting pendulum (2) with the spikes (4) thereof is arranged, by its own weight, to engage into and hold a piece of wood within the range of pivoting of the pendulum (2), and the frame (9) is openly shaped towards one side for allowing insertion of pieces of wood sideways from the open side.

2. A device according to claim 1, characterized in that the con-joint action of the spikes (4) on the pendulum (2) and the spikes (3) on the lower frame part (1) holds varying pieces of wood by the weight of the piece of wood itself in its overhang.

3. A device according to claim 1, characterized in that the spikes (4) of the pendulum (2) as well as the spikes (3) of the lower frame part (1) are located in rows oriented essentially along the pivot axis of the pendulum (2).

4. A device according to claim 1, characterized in that the pendulum (2) is movable upwards, for thicker pieces of wood, by being lifted above a horizontal plane, whereby it is disengaged from a locking shoulder (5) and can be moved sideways in order thereafter to be re-mounted in a lower hole of the pendulum.

5. A device according to claim 1, characterized in that the pivotal mounting of the pendulum (2) is formed of at least one dowel or pin (7) which is receivable in at least one hole (6) in the pendulum, and that the pendulum (2) is moveable along the dowel or the pin, into and out of, respectively, engagement between this and hole of the pendulum.

6. A device for holding varying pieces of wood when cutting, the device comprising:

a frame (9), a pendulum (2) having spikes (4) and being pivotally mounted at an upper part (8) of the frame (9), and a lower frame part (1) having upwardly directed spikes (3), characterized in that the pendulum (2) with the spikes (4) thereof is arranged to assume steplessly varying positions in relation to the upwardly directed spikes (3) of the lower frame part (1), the freely pivoting pendulum (2) with the spikes (4) thereof is arranged, by its own weight, to engage into and hold a piece of wood within the range of pivoting of the pendulum (2), and the freely pivoting pendulum (2) is adjustable in length between the pivot axis the spikes (4).

7. A device according to claim 6, characterized in that the pendulum (2) is movable upwards, for thicker pieces of wood, by being lifted above a horizontal plane, whereby it is disengaged from a locking shoulder (5) and can be moved sideways in order thereafter to be re-mounted in a lower hole of the pendulum.

8. A device according to claim 6, characterized in that the pivotal mounting of the pendulum (2) is formed of at least one dowel or pin (7) which is receivable in at least one hole (6) in the pendulum, and that the pendulum (2) is moveable along the dowel or the pin, into and out of, respectively, engagement between this and hole of the pendulum.

9. A device for holding varying pieces of wood when cutting, the device comprising:

a frame (9), a pendulum (2) having spikes (4) and being pivotally mounted at an upper part (8) of the frame (9), and a lower frame part (1) having upwardly directed spikes (3), characterized in that the pendulum (2) with the spikes (4) thereof is arranged to assume steplessly varying positions in relation to the upwardly directed spikes (3) of the lower frame part (1), the freely pivoting pendulum (2) with the spikes (4) thereof is arranged, by its own weight, to engage into and hold a piece of wood within the range of pivoting of the pendulum (2), and the pendulum (2) is movable upwards, for thicker pieces of wood, by being lifted above a horizontal plane, whereby it is disengaged from a locking shoulder (5) and can be moved sideways in order thereafter to be re-mounted in a lower hole of the pendulum (2).

10. A device according to claim 9, characterized in that the pendulum (2) is lockable in a certain position above a horizontal plane.

11. A device according to claim 10, characterized in that the pivotal mounting of the pendulum (2) is formed of at least one dowel or pin (7) which is receivable in at least one hole (6) in the pendulum, and that the pendulum (2) is moveable along the dowel or the pin, into and out of, respectively, engagement between this and hole of the pendulum.

12. A device according to claim 9, characterized in that the locking shoulder (5) is arranged to support the pendulum (2) in an upwardly pivoted position.

13. A device according to claim 9, characterized in that the pivotal mounting of the pendulum (2) is formed of at least one dowel or pin (7) which is receivable in at least one hole (6) in the pendulum, and that the pendulum (2) is moveable along the dowel or the pin, into and out of, respectively, engagement between this and hole of the pendulum.

14. A device for holding varying pieces of wood when cutting, the device comprising:

a frame (9), a pendulum (2) having spikes (4) and being pivotally mounted at an upper part (8) of the frame (9), and a lower frame part (1) having upwardly directed spikes (3), characterized in that the pendulum (2) with the spikes (4) thereof is arranged to assume steplessly varying positions in relation to the upwardly directed spikes (3) of the lower frame part (1), the freely pivoting pendulum (2) with the spikes (4) thereof is arranged, by its own weight, to engage into and hold a piece of wood within the range of pivoting of the pendulum (2), the pivotal mounting of the pendulum (2) is formed of at least one dowel or pin (7) which is receivable in at least one hole (6) in the pendulum (2), and the pendulum (2) is movable along the dowel or the pin (7), into and out of, respectively, engagement between this and the hole of the pendulum (2).

15. A device according to claim 14, characterized in that the pendulum (2) is provided with a series of holes (6), in which the dowel or pin (7) is receivable.

16. A device according to claim 15, characterized in that the pendulum (2) is essentially U-shaped with a base part provided with the spikes (4) and shanks each provided with holes (6) for receiving dowels or pins (7).

17. A device according to claim 14 or 15, characterized in that the pendulum (2) is essentially U-shaped with a base part provided with the spikes (4) and shanks each provided with holes (6) for receiving dowels or pins (7).

18. A device for holding varying pieces of wood when cutting, the device comprising:

a frame (9), a pendulum (2) having spikes (4) and being pivotally mounted at an upper part (8) of the frame (9), and a lower frame part (1) having upwardly directed spikes (3), characterized in that the pendulum (2) with the spikes (4) thereof is arranged to assume steplessly varying positions in relation to the upwardly directed spikes (3) of the lower frame part (1), the freely pivoting pendulum (2) with the spikes (4) thereof is arranged, by its own weight, to engage into and hold a piece of wood within the range of pivoting of the pendulum (2), the frame (9) is pivotally connected to a base frame for supporting against an underlayer, the frame (9) is pivotal in relation to the base frame between a position in which it is raised from it and a position in which it is folded towards the base frame, and releasable means are provided for locking the frame (9) in its raised position.

19. A device according to claim 18, characterized in that the frame (9) together with the pendulum (2) is foldable to a position essentially inside the base frame.

* * * * *